(12) United States Patent
Mazur et al.

(10) Patent No.: US 8,388,289 B2
(45) Date of Patent: Mar. 5, 2013

(54) SELF-SUPPORTING BRACKET NUT

(75) Inventors: Lorin A. Mazur, Shelby, MI (US);
Kevin K. Parkila, Royal Oak, MI (US);
Michael R. Kaphengst, Leonard, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 355 days.

(21) Appl. No.: 12/754,051

(22) Filed: Apr. 5, 2010

(65) Prior Publication Data
US 2011/0243685 A1 Oct. 6, 2011

(51) Int. Cl.
*F16B 37/02* (2006.01)
(52) U.S. Cl. .......................................... 411/173; 411/112
(58) Field of Classification Search ................. 411/73, 411/103, 112, 125, 127, 131, 141, 144, 172–176
See application file for complete search history.

(56) References Cited

U.S. PATENT DOCUMENTS

| | | | | |
|---|---|---|---|---|
| 2,198,439 A | * | 4/1940 | Kost | 411/173 |
| 2,516,274 A | * | 7/1950 | Tinnerman | 411/112 |
| 2,661,821 A | * | 12/1953 | Tinnerman | 403/21 |
| 2,719,558 A | * | 10/1955 | Tinnerman | 411/173 |
| 2,908,311 A | * | 10/1959 | Garman | 411/103 |
| 2,982,324 A | * | 5/1961 | Zerhan, Jr. | 411/247 |
| 3,192,823 A | * | 7/1965 | Munse | 411/15 |
| 4,089,614 A | * | 5/1978 | Harley | 403/231 |
| 7,192,231 B2 | * | 3/2007 | Blackaby | 411/111 |
| 7,246,978 B2 | * | 7/2007 | Morishima et al. | 411/104 |

FOREIGN PATENT DOCUMENTS
DE 202007008154 U1 9/2007
* cited by examiner

*Primary Examiner* — Gary Estremsky
(74) *Attorney, Agent, or Firm* — Quinn Law Group, PLLC

(57) ABSTRACT

A bracket nut for coupling a fastener to a sheet member is provided. The sheet member defines a first plane and the bracket nut defines a second plane, which is at an offset angle to the first plane. The sheet member defines a first hole substantially perpendicular to the first plane, and the bracket nut is configured to mate with the first hole. A second hole is defined in the bracket nut and is substantially perpendicular to the second plane. The second hole is configured to accept the fastener. The offset angle may be between approximately thirty to approximately sixty degrees. The bracket nut may include a first cantilevered arm and a second cantilevered arm. The first cantilevered arm and the second cantilevered arm are configured to prevent rotation about the first hole.

20 Claims, 4 Drawing Sheets

SELF-SUPPORTING BRACKET NUT

TECHNICAL FIELD

This disclosure relates generally to nuts for coupling fasteners for thin-wall structures.

BACKGROUND

Many components—such as those within vehicles—are coupled to thin-wall structures, such as those formed from sheet metal. The components may have one or more holes through which fasteners are inserted to hold the component to the sheet metal. Coupling the fastener to the sheet metal generally includes driving the fastener directly into the sheet metal at a substantially perpendicular (ninety-degree) angle.

Vehicle doors may generally be formed from at least three layers or panels. An exterior body panel is often the layer viewed from the outside of the vehicle. An interior trim panel is often the layer viewed from the interior or cabin of the vehicle, and may include door pull handles or cups along with mounting surfaces for controls, such as window buttons and door locks. An outer sheet metal panel is often intermediate the exterior body panel and the interior trim panel. The outer sheet metal panel may be structural and provide the attachment points for the interior trim panel and door hardware, such as locks and window motors.

SUMMARY

A bracket nut for coupling a fastener to a sheet member is provided. The sheet member defines a first plane and the bracket nut defines a second plane, which is at an offset angle to the first plane. The sheet member defines a first hole substantially perpendicular to the first plane, and the bracket nut is configured to mate with the first hole. A second hole is defined in the bracket nut and is substantially perpendicular to the second plane. The second hole is configured to accept the fastener.

The offset angle may be between approximately thirty to approximately sixty degrees. The bracket nut may include a first cantilevered arm and a second cantilevered arm. The first cantilevered arm and the second cantilevered arm are configured to prevent rotation about the first hole.

The above features and advantages, and other features and advantages, of the present invention are readily apparent from the following detailed description of the best modes and other embodiments for carrying out the invention when taken in connection with the accompanying drawings.

DETAILED DESCRIPTION

Figure 1:
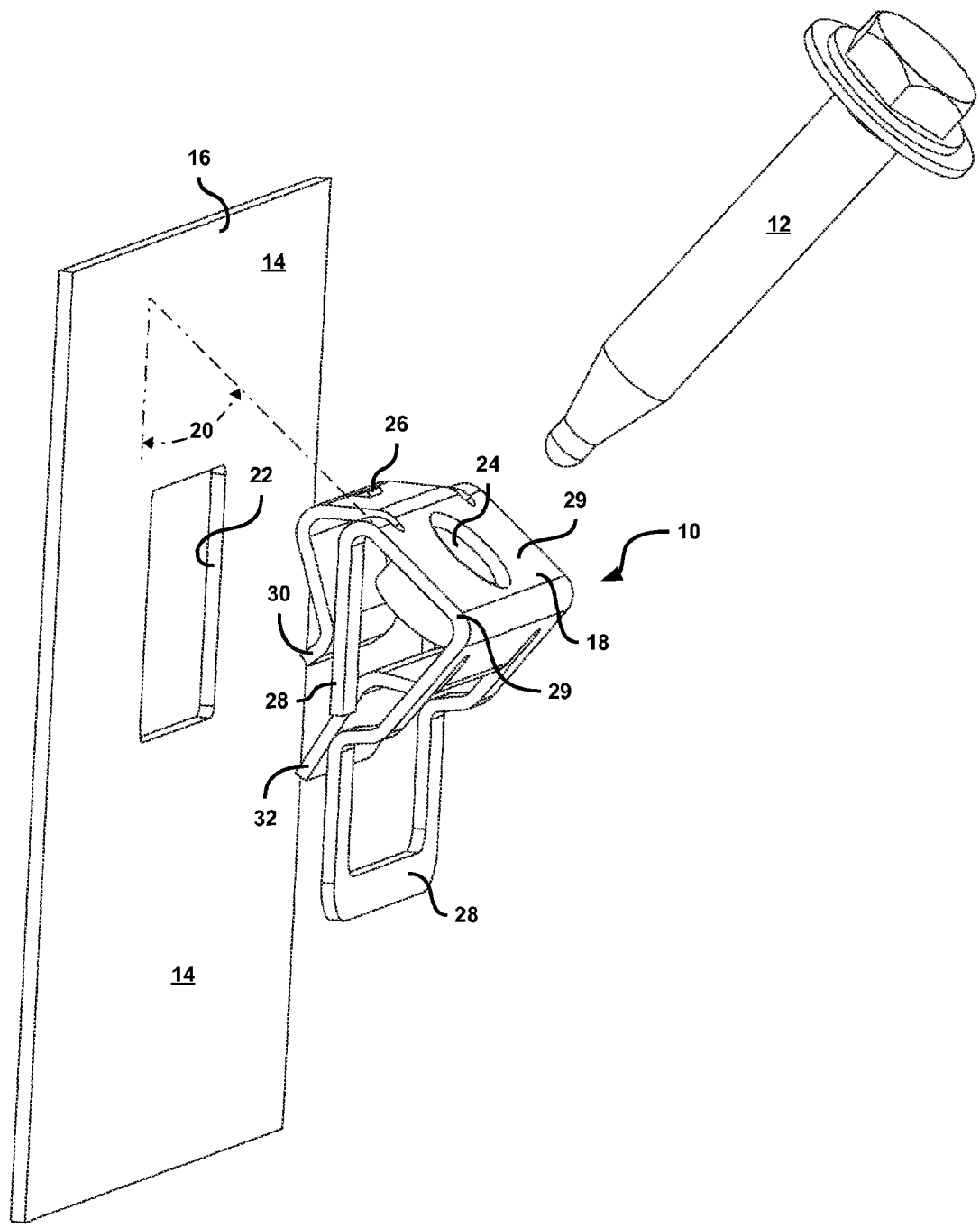
FIG. 1 is a schematic exploded, isometric view of a bracket nut for coupling a fastener to a sheet member.
Figure 2:
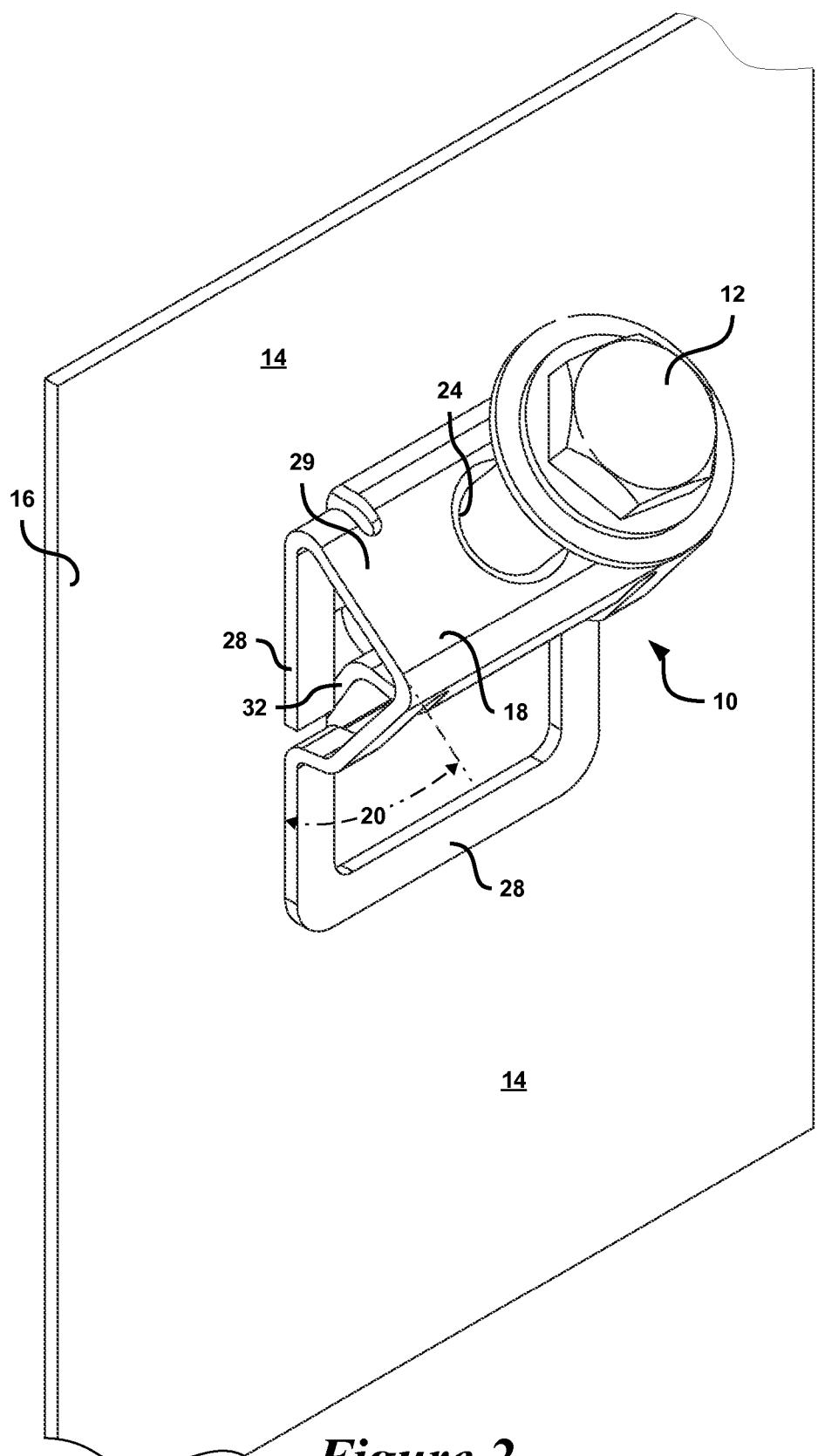
FIG. 2 is a schematic isometric view of the assembled bracket nut coupling the fastener and sheet member shown in FIG. 1.

Referring to the drawings, wherein like reference numbers correspond to like or similar components throughout the several figures, there is shown in FIG. 1 an isometric, exploded view of a bracket nut 10 for coupling a bolt, screw, or fastener 12 to a sheet member 14 or another thin-wall structure. Similarly, there is shown in FIG. 2 a schematic isometric view of the bracket nut 10 assembled to the sheet member 14 and coupling the fastener 12 to the sheet member 14.

The sheet member 14 may be, for example and without limitation, a portion or region of an outer sheet metal panel of a vehicle door assembly. In such an application, the fastener 12 may be utilized to attach an interior trim panel, door pull handle, or similar structure to the outer sheet metal panel. The sheet member 14 may be much larger than the representative portion shown in FIGS. 1 and 2. The vehicle door assembly may further include an exterior body panel (not shown) on the opposite side of the sheet member 14 (which is a portion of the outer sheet metal panel) from the fastener 12 (and interior trim panel). As described below, regardless of the application or assembly into which the bracket nut 10 is incorporated, the bracket nut 10 enables coupling the fastener 12 to the sheet member 14 at a non-perpendicular angle.

While much of the present invention is described in detail with respect to automotive applications, those skilled in the art will recognize the broader applicability of the invention. Those having ordinary skill in the art will also recognize that terms such as "above," "below," "upward," "downward," et cetera, are used descriptively of the figures, and do not represent limitations on the scope of the invention, as defined by the appended claims.

A first plane or sheet plane 16 is defined by the sheet member 14 and is substantially parallel to the sheet member 14. The whole of the sheet member 14 need not be planar and, in many applications, a substantial portion of the sheet member 14 may not be coplanar or parallel with the sheet plane 16. For example, and without limitation, the sheet plane 16 may be on a protrusion or boss extending away from the bulk of the outer sheet metal panel of the vehicle door and toward the interior trim panel. However, the area adjacent the bracket nut 10 defines and is coplanar with the sheet plane 16.

A second plane or fastener plane 18 is defined by the bracket nut 10. The fastener plane 18 is at an offset angle 20 to the sheet plane 16. The sheet member 14 defines a first hole or sheet hole 22 substantially perpendicular to the sheet plane 16. The bracket nut 10 is configured to mate with the sheet hole 22, which, as shown in FIGS. 1 and 2, may be generally rectangular in cross section or shape. A second hole or fastener hole 24 is defined in the bracket nut 10. The fastener hole 24 is substantially perpendicular to the fastener plane 18 and is configured to accept the fastener 12. Some or all of the fastener hole 24 and a portion of the fastener 12 may have corresponding threads.

During assembly, the bracket nut 10 may be first assembled to the sheet member 14 by placing the bracket nut 10 within the sheet hole 22, as viewed in FIG. 2. The bracket nut 10 is self-supporting within the sheet hole 22. Then, the fastener 12 may be driven into the fastener hole 24 via the threaded portions. Therefore, the bracket nut 10 need not be independently held or supported by other components or assembly tools prior to mating the fastener 12 to the fastener hole 24.

During mating or coupling of the fastener 12 to the sheet member 14, the fastener 12 may be aligned generally perpendicular to the fastener plane 18 and substantially coaxial with the fastener hole 24. This allows the fastener 12 to be mated to the bracket nut 10 without perpendicular access to the sheet plane 16. Furthermore, the bracket nut 10 couples the fastener 12—and any other component attached to the fastener 12—to the sheet member 14 without additional components or hardware.

Perpendicular access to the sheet plane 16 and the sheet hole 22 may be blocked or impeded by portions of the interior trim panel or other interior components. Furthermore, the bracket nut 10 is configured such that the fastener 12 does not directly contact the sheet member 14 after assembly.

The offset angle 20 may be in a range of forty to fifty degrees (inclusive). In the configurations shown in FIGS. 1 and 2, the offset angle 20 is approximately 45 degrees. However, the bracket nut 10 may be configured with a larger range for the offset angle 20, and the offset angle 20 may be as small as thirty degrees or as large as 60 degrees.

During assembly, the offset angle 20, and therefore the resulting angle of the fastener 12, may change slightly as the fastener 12 is mated to the bracket nut 10. The sheet hole 22 shown in FIGS. 1 and 2 has a generally-rectangular cross section, which may prevent rotation of the bracket nut 10 as the fastener 12 is driven into the fastener hole 24.

Figure 3:
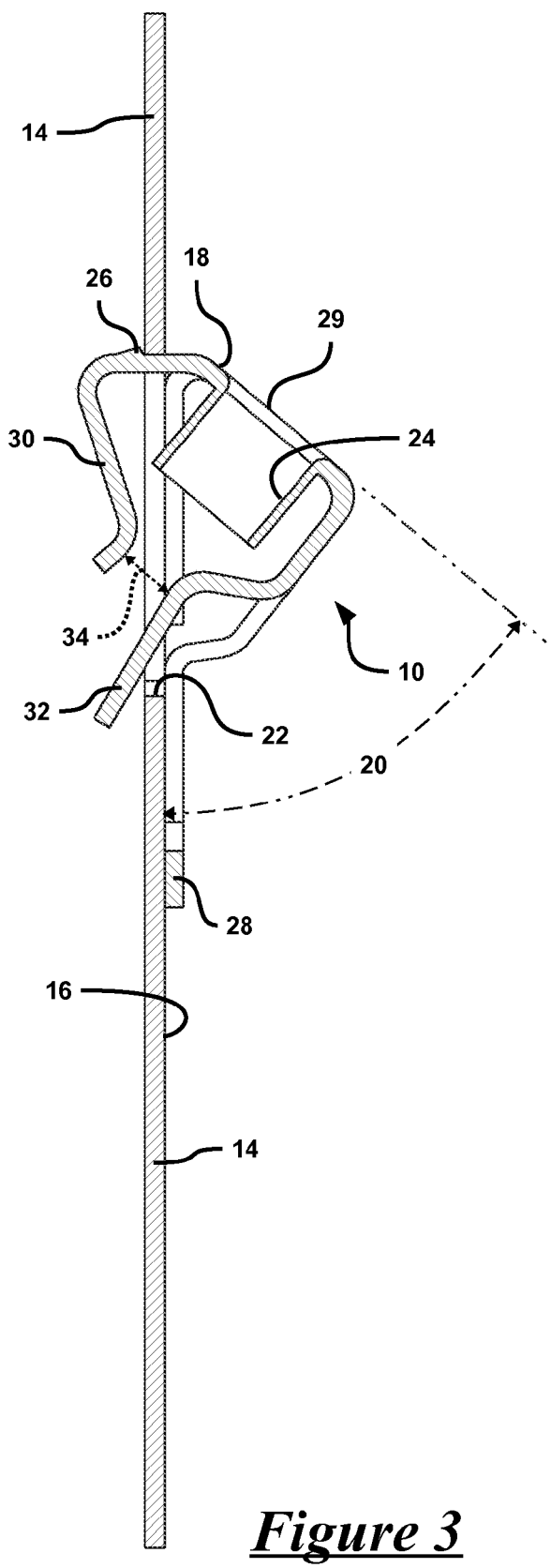
FIG. 3 is a schematic cross-sectional view of the bracket nut and sheet member of FIGS. 1 and 2, shown in a closed state before the fastener is inserted.

Referring now to FIG. 3, and with continued reference to FIGS. 1 and 2, there is shown a schematic cross-sectional view of the bracket nut 10 and the sheet member 14. In FIG. 3, the bracket nut 10 is mated to the sheet hole 22, but the fastener 12 (not shown in FIG. 3) has yet to be inserted into the fastener hole 24.

The bracket nut 10 includes a barb 26 projecting toward the sheet plane 16. The barb 26 is configured to prevent removal of the bracket nut 10 from the sheet hole 22, but is angled such that it does not prevent insertion of the bracket nut 10 into the sheet hole 22. A plurality of plane arms 28 abut the sheet member 14 and are generally parallel to the sheet plane 16. The plurality of plane arms 28 may prevent the bracket nut 10 from moving or rotating through the sheet hole 22. A face plate 29 defines the second plane 18. The face plate 29 also defines the fastener hole 24, which is substantially perpendicular to the face plate 29.

The bracket nut 10 also includes a first cantilevered arm 30 and a second cantilevered arm 32. The first cantilevered arm 30 and the second cantilevered arm 32 extend through the sheet hole 22 and cooperate with the walls of the sheet hole 22 to prevent rotation of the bracket nut 10 relative to the sheet hole 22 or sheet member 14. Either of the arms may be labeled "first" or "second". The first cantilevered arm 30 and the second cantilevered arm 32 cooperate with the plurality of plane arms 28 to prevent movement of the bracket nut 10 relative to the sheet member 14. The barb 26 is formed as a boss on the first cantilevered arm 30, and may extend across the whole of the first cantilevered arm 30 or only a portion thereof.

As shown in FIG. 3, the first cantilevered arm 30 and second cantilevered arm 32 define an expandable slot 34, which is located partially in the path of the fastener 12 (not shown in FIG. 3). The first cantilevered arm 30 and the second cantilevered arm 32 are therefore configured to grasp and receive the fastener 12 as it is driven through the fastener hole 24.

The expandable slot 34 is configured to be adjusted from a closed state to an expanded state by the fastener 12 to the bracket nut 10. Because the bracket nut 10 is shown prior to mating the fastener 12 (which is not shown in FIG. 3), the expandable slot 34 is shown in the closed state in FIG. 3. In the closed state, the first cantilevered arm 30 and the second cantilevered arm 32 allow the bracket nut 10 to be inserted into the sheet hole 22.

Figure 4:
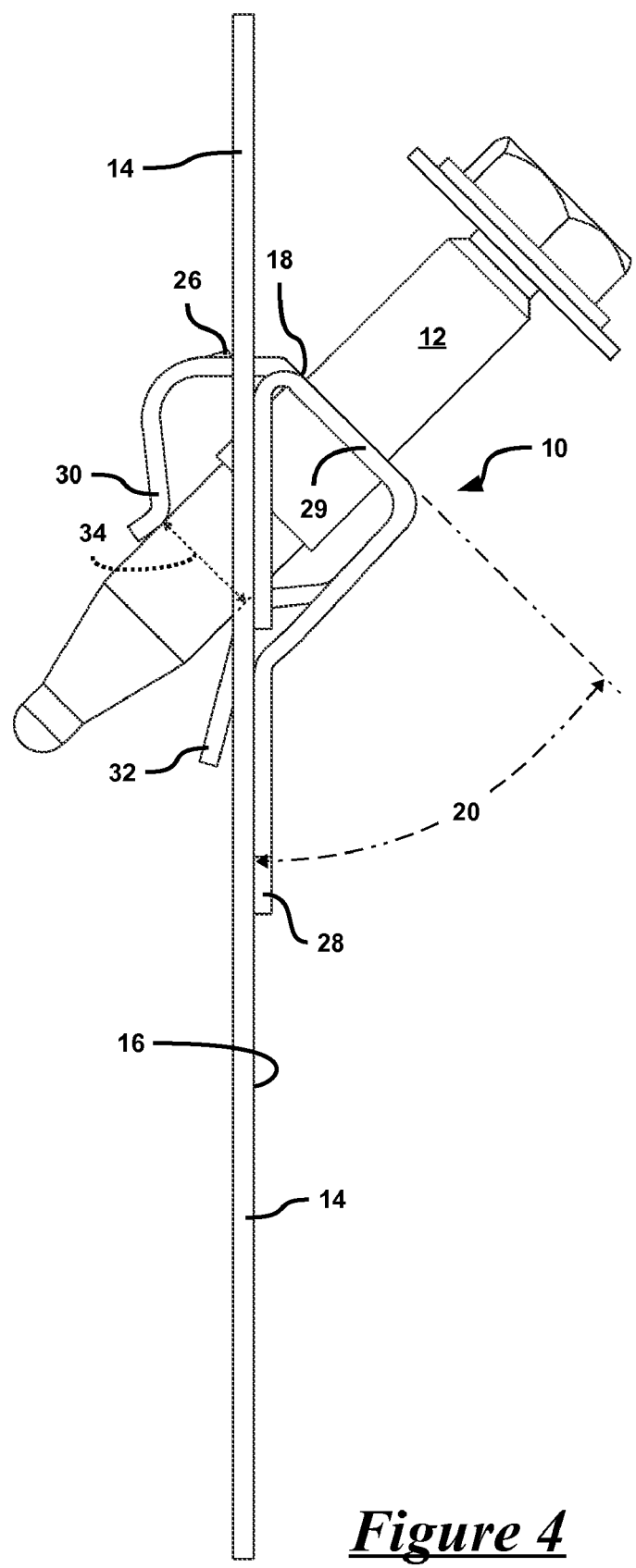
FIG. 4 is a schematic side view of the sheet member, bracket nut and fastener of FIGS. 1 and 2, shown in an expanded state with the fastener inserted.

Referring now to FIG. 4, and with continued reference to FIGS. 1-3, there is shown a schematic side view of the bracket nut 10 after the fastener 12 has been driven into the fastener hole 24. Driving the fastener 12 into the fastener hole 24 places the expandable slot 34 of the bracket nut 10 in the expanded state. The fastener 12 may be mated to, or in cooperation with, an attachment portion (not shown) of a door pull handle, a door pull cup, or an interior trim panel to the sheet member 14, such that the attachment portion is gripped between the fastener plane 18 of the bracket nut 10 and the head of the fastener 12.

In FIG. 4, the bracket nut 10 and expandable slot 34 are shown in the expanded state. In the expanded state, the first cantilevered arm 30 and second cantilevered arm 32 have rotated away from the fastener 12, causing portions of the first cantilevered arm 30 and second cantilevered arm 32 to be biased against the sheet member 14. Furthermore, in the expanded state, the barb 26 is biased against the sheet member 14 by the first cantilevered arm 30.

In the expanded state, the first cantilevered arm 30 and the second cantilevered arm 32 are biased against the sheet member 14 and the edges of the sheet hole 22, and will not allow the bracket nut 10 to be removed from the sheet hole 22 (at least not without the application of large forces). Biasing the first cantilevered arm 30 and the second cantilevered arm 32 against the sheet member 14 and the edges of the sheet hole 22 allows the bracket nut 10 to retain torque imparted during the assembly process.

The first cantilevered arm 30 and the second cantilevered arm 32 also provide torque retention by generating a spring force (squeezing) against the fastener 12. Torque retention reduces the likelihood of the fastener 12 loosening or backing away from the bracket nut 10, and may reduce the likelihood of the attachment portion of the interior trim panel loosing or being removed from the fastener 12 and bracket nut 10. Torque retention also reduces the likelihood of the bracket nut 10 loosening or being pulled from the sheet member 14.

Taking the expandable slot 34 from the closed state to the expanded state may slightly rotate or alter the fastener plane 18 and the offset angle 20. For example, and without limitation, the offset angle 20 may be approximately 40 degrees when the bracket nut 10 is first placed (in the closed state) into the sheet hole 22. However, after the fastener 12 is driven into the bracket nut 10 and the bracket nut 10 expands, the offset angel 20 may be approximately 45 degrees.

While the best modes and other embodiments for carrying out the claimed invention have been described in detail, those familiar with the art to which the invention relates will recognize various alternative designs and embodiments for practicing the invention defined in the appended claims.

The invention claimed is:

1. A bracket nut coupled with a sheet member defining a first plane, the bracket nut comprising:
    a face plate;
    a second plane defined by the face plate, wherein the second plane is at an offset angle to the first plane defined by the sheet member, and the offset angle is between thirty to sixty degrees;
    wherein the sheet member defines a first hole having an axis extending in a direction substantially perpendicular to the first plane, and the bracket nut is configured to mate with the first hole;
    a second hole defined by the face plate and having an axis extending in a direction substantially perpendicular to the second plane, such that the axis of the second hole is not substantially parallel with the axis of the first hole, wherein the second hole is configured to accept a fastener substantially along the axis of the second hole, and the fastener extends through the second hole and the first hole;
    a first cantilevered arm extending from one side of the face plate; and a second cantilevered arm extending from an opposing side of the face plate relative to the first cantilevered arm, wherein the first cantilevered arm and the second cantilevered arm are configured to prevent rotation about the first hole.

2. The bracket nut of claim 1, further comprising a barb projecting toward the first plane and configured to prevent removal of the bracket nut from the first hole.

3. The bracket nut of claim 2, wherein the barb is a boss on the first cantilevered arm.

4. The bracket nut of claim 3,
wherein the first cantilevered arm and the second cantilevered arm define an expandable slot configured to receive the fastener, and
wherein the expandable slot is configured to be adjusted from a closed state to an expanded state by the fastener.

5. The bracket nut of claim 4, wherein the expandable slot biases the barb against the sheet member when in the expanded state.

6. The bracket nut of claim 5, wherein the offset angle is between forty to fifty degrees.

7. The bracket nut of claim 6, wherein the first hole has a generally-rectangular cross section.

8. The bracket nut of claim 7, wherein the bracket nut is configured such that the fastener does not directly contact the sheet member.

9. The bracket nut of claim 1,
wherein the first cantilevered arm and the second cantilevered arm define an expandable slot configured to receive the fastener, and
wherein the expandable slot is configured to be adjusted from a closed state to an expanded state by the fastener.

10. The bracket nut of claim 1, wherein the bracket nut is configured such that the fastener does not directly contact the sheet member.

11. A bracket nut coupling a fastener to a sheet member, wherein the sheet member defines a first plane, the bracket nut comprising:
a face plate;
a second plane defined by the face plate, wherein the second plane is at an offset angle to the first plane defined by the sheet member;
wherein the sheet member defines a first hole having an axis extending in a direction substantially perpendicular to the first plane, and the bracket nut is configured to mate with the first hole;
a second hole defined by the face plate and having an axis extending in a direction substantially perpendicular to the second plane, such that the axis of the second hole is not substantially parallel with the axis of the first hole, wherein the second hole is configured to accept the fastener substantially along the axis of the second hole and the fastener extends through the second hole and the first hole; and
a barb projecting toward the first plane and configured to prevent removal of the bracket nut from the first hole.

12. The bracket nut of claim 11, further comprising:
a first cantilevered arm; and
a second cantilevered arm, wherein the first cantilevered arm and the second cantilevered arm are configured to prevent rotation about the first hole.

13. The bracket nut of claim 12, wherein the first hole has a generally-rectangular cross section.

14. The bracket nut of claim 13, wherein the barb is a boss on the first cantilevered arm.

15. The bracket nut of claim 14,
wherein the first cantilevered arm and the second cantilevered arm define an expandable slot configured to receive the fastener, and
wherein the expandable slot is configured to be adjusted from a closed state to an expanded state by the fastener.

16. The bracket nut of claim 15, wherein the expandable slot biases the first cantilevered arm and the second cantilevered against the first hole of the sheet member when the expandable slot is in the expanded state.

17. The bracket nut of claim 16, wherein the expandable slot biases the barb against the sheet member when in the expanded state.

18. The bracket nut of claim 17, wherein the first cantilevered arm and the second cantilevered provide a spring force against the fastener.

19. The bracket nut of claim 18, wherein the offset angle is between thirty to sixty degrees.

20. The bracket nut of claim 18, wherein the offset angle is between forty to fifty degrees.

\* \* \* \* \*